(12) United States Patent
Najmi et al.

(10) Patent No.: US 9,704,108 B2
(45) Date of Patent: Jul. 11, 2017

(54) SYSTEM AND METHOD FOR NETWORK VISUALIZATION AND PLAN REVIEW

(75) Inventors: Adeel Najmi, Plano, TX (US); Larry P. Mason, Corinth, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 2061 days.

(21) Appl. No.: 11/218,876

(22) Filed: Sep. 2, 2005

(65) Prior Publication Data

US 2006/0004617 A1    Jan. 5, 2006

Related U.S. Application Data

(60) Provisional application No. 60/689,915, filed on Jun. 13, 2005.

(51) Int. Cl.
*G06Q 10/00* (2012.01)
*G06Q 10/06* (2012.01)

(52) U.S. Cl.
CPC ............ *G06Q 10/00* (2013.01); *G06Q 10/06* (2013.01); *G06Q 10/0637* (2013.01); *G06Q 10/06315* (2013.01); *G06Q 10/06316* (2013.01); *G06Q 10/06375* (2013.01)

(58) Field of Classification Search
None
See application file for complete search history.

(56) References Cited

U.S. PATENT DOCUMENTS 5,946,662 A * 8/1999 Ettl et al. ............... 705/7.26
6,144,962 A * 11/2000 Weinberg et al.
6,462,736 B1 * 10/2002 Ross et al. ............... 345/419
6,574,619 B1 * 6/2003 Reddy et al.
6,577,304 B1 * 6/2003 Yablonski et al. ............ 345/419

(Continued)

FOREIGN PATENT DOCUMENTS

WO    WO 03/090036 A2    10/2003

OTHER PUBLICATIONS

Kalchschmidt et al., "Inventory management in a multi-echelon spare parts supply chain", Int. J. Production Economics 81-82 (2003), pp. 397-413.*

*Primary Examiner* — Thomas L Mansfield, Jr.
(74) *Attorney, Agent, or Firm* — Jackson White, PC; Steven J. Laureanti

(57) ABSTRACT

A computer-implemented system, a method thereof, and a computer-readable medium comprising a supply chain visualizer providing a plurality of graphical elements in a multi-dimensional supply chain network view and a plan display providing a plurality of graphical elements in a multi-dimensional tabular view, a multi-directional capability for traversing between the supply chain visualizer and the plan display operable to receive input from a planner during a planning session specifying a plan problem, reflecting changes to data associated with the plan display back to data associated with the supply chain visualizer, reflecting changes to data associated with the supply chain visualizer back to data associated with the plan display, traversing the multi-dimensional supply chain network via a real-time interaction between the multi-dimensional tabular view of the plan display and the visual representation of the graphical view of the supply chain visualizer, and providing the planner the ability to generate a plan.

27 Claims, 4 Drawing Sheets

(56) References Cited

U.S. PATENT DOCUMENTS

| | | | |
|---|---|---|---|
| 6,789,252 B1* | 9/2004 | Burke | G06F 8/10 717/100 |
| 6,995,768 B2* | 2/2006 | Jou et al. | 345/440 |
| 7,516,084 B1* | 4/2009 | Sankaran et al. | 705/7.31 |
| 7,899,915 B2* | 3/2011 | Reisman | 709/228 |
| 2003/0144868 A1* | 7/2003 | MacIntyre | G06F 17/30536 705/7.38 |
| 2004/0117230 A1 | 6/2004 | Jones et al. | |
| 2005/0144072 A1* | 6/2005 | Perkowski et al. | 705/14 |
| 2005/0240493 A1* | 10/2005 | Johnson et al. | 705/27 |

* cited by examiner

Details

Target Review                                                                                                                View

[toolbar icons]

| PRESP | CG | ItemType | ChgPrcnt | ControlRng | OptPlcy |
|---|---|---|---|---|---|
| All | All | All | All | All | All |

⎫ 440 ⎭     ⎫ 430 ⎭

Legend: Orange, Yellow, Green, Red, Pink

| Item | LocType | Location | | Accepted | LastApproved | NewTarget | QtyChange | PrctChg | SS | LTD | DemRate |
|---|---|---|---|---|---|---|---|---|---|---|---|
| Chips | Bin | Bin-from-TOPEKA | | 90,265 | 119,023 | 90,265 | -28,758 | 24.2 | 50,777 | 39,488 | 5,611 |
|  | DC | GRIMES | | 29,381 | 35,927 | 29,381 | -6,546 | 18.2 | 8,187 | 21,194 | 2,114 |
|  |  | KANSAS CITY | | 34,057 | 41,909 | 34,057 | -7,852 | 18.7 | 11,228 | 22,829 | 3,230 |
|  |  | LA VISTA | | 3,601 | 4,504 | 3,601 | -903 | 20.0 | 1,352 | 2,249 | 320 |
|  |  | WICHITA | | 20,875 | 23,571 | 20,875 | -2,696 | 11.4 | 3,201 | 17,674 | 2,517 |
|  | SDC | Vend-from-TOPEKA | | 1,305 | 1,752 | 1,305 | -447 | 25.5 | 990 | 315 | 193 |
|  | Plant-Warehouse | TOPEKA | | 1,046 | 624 | 1,046 | 422 | 67.6 | 1,036 | 10 | 12,980 |
| Grand Total | | | | 180,530 | 227,310 | 180,530 | -46,780 | 20.6 | 76,772 | 103,758 | 26,965 |

SYSTEM AND METHOD FOR NETWORK VISUALIZATION AND PLAN REVIEW

CROSS-REFERENCE TO RELATED APPLICATIONS

This application claims the benefit under 35 U.S.C. §119 (e) of U.S. Provisional Application Ser. No. 60/689,915 filed 13 Jun. 2005 entitled "NETWORK VISUALIZATION AND PLAN REVIEW." The present invention is related to that disclosed in pending U.S. patent application Ser. No. 10/165,640, filed on 7 Jun. 2002 and entitled "MANAGING PLAN PROBLEMS ACROSS PLANNING CYCLES". U.S. patent application Ser. No. 10/165,640 and U.S. Provisional Application Ser. No. 60/689,915 are commonly assigned to the assignee of the present application. The disclosure of related U.S. patent application Ser. No. 10/165,640 and U.S. Provisional Application Ser. No. 60/689,915 are hereby incorporated by reference into the present disclosure as if fully set forth herein.

BACKGROUND

1. Field of the Invention

The present invention relates generally to inventory management and in particular, to a system and method for providing supply chain network visualization and plan review.

2. Description of Related Art

Supply chain planning applications develop production and distribution plans to attempt to match supply with demand to meet business objectives. Today, supply chains are often extremely complex spaghetti networks, including large networks of supplier facilities, manufacturing facilities, distribution facilities, and sales channels spread around the world. As a result, a supply chain plan may include a large number of problems, such as late orders, short orders, over utilized or underutilized resources, safety stock violations, or other problems. It is typically the responsibility of a planner to minimize such problems by attempting to investigate any potential plan problems and generate a new plan to avoid these potential problems.

Supply chain planning and other advanced planning system applications typically provide a single dimensional "problem window" that presents problems in a given plan, which are typically categorized according to type and prioritized according to severity. In an effort to rectify these isolated problems, planners may directly compare current plans with previous plans to determine the status of plan problems. However, there are several shortcomings associated with such isolated single dimensional applications. As an example, such comparisons may require a great deal of time and effort on the part of a planner, may be plagued by human error, and may provide limited insight into the actual multi-dimensional plan problems. As another example, such applications may not account for the fact that problems may have life cycles such that they repeatedly arise in successive planning cycles or that actions taken to correct such problems may have multi-dimensional effects in successive planning cycles. As yet another example, reconciling the results of a current plan with those of previous plans using such applications may require direct comparisons between stored plans, which are limited in their ability to give insight into the actual plan problems, particularly over long periods of time. As still another example, such applications may provide no way to efficiently identify and prioritize problems across a multi-dimensional supply chain network.

Although great strides have been made in the area of supply chain planning, many shortcomings remain.

SUMMARY OF THE INVENTION

There is a need in the art for providing a system and method for providing supply chain network visualization and plan review. There is also a need to provide a planner with the ability to traverse the visualization and plan review. Therefore, it is an object of the present invention to provide a system for providing a visual representation of a multi-dimensional supply chain network view and a multi-dimensional tabular view and the ability to traverse between these multi-dimensional views in a multi-directional capability.

This object is achieved by providing a computer-implemented system for providing supply chain network visualization and plan review. According to the preferred embodiment of the present invention, the computer-implemented system comprises a supply chain visualizer capable of providing a visual representation of one or more graphical elements in a multi-dimensional supply chain network. The computer-implemented system further comprises a plan display capable of providing a visual representation of one or more graphical elements in a multi-dimensional tabular view. The computer-implemented system still further comprises a multi-directional capability for providing context sensitive traversing between the supply chain visualizer and the plan display.

It is another object of the present invention to provide a computer-implemented method for providing a visual representation of a multi-dimensional supply chain network and a multi-dimensional tabular view and the ability to traverse between these multi-dimensional views in a multi-directional capability.

This object is achieved by providing a computer-implemented method for providing supply chain network visualization and plan review, the method performed using one or more computer systems each comprising one or more processing units and one or more memory units at one or more locations. According to the preferred embodiment of the present invention, the method comprises the steps of providing a visual representation of one or more graphical elements in a multi-dimensional supply chain network. The method further comprises the steps of providing a visual representation of one or more graphical elements in a multi-dimensional tabular view. The method still further comprises the steps of providing a multi-directional capability for a context sensitive traversing between the supply chain visualizer and the plan display.

It is still another object of the present invention to provide a computer-readable medium for providing a visual representation of a multi-dimensional supply chain network and a multi-dimensional tabular view and the ability to traverse between these multi-dimensional views in a multi-directional capability.

This object is achieved by providing a computer-readable medium having encoded thereon software for providing supply chain network visualization and plan review. According to the preferred embodiment of the present invention, the computer-readable medium comprises instructions for providing a visual representation of one or more graphical elements in a multi-dimensional supply chain network. The computer-readable medium further comprises the steps of providing a visual representation of one or more graphical elements in a multi-dimensional tabular view. The computer-readable medium further comprises the steps of providing a multi-directional capability for a context sensitive traversing between the supply chain visualizer and the plan display.

The present invention provides the following advantages: (1) a supply chain visualizer capable of providing a visual representation of one or more graphical elements in a multi-dimensional supply chain network; (2) a plan display capable of providing a visual representation of one or more graphical elements in a multi-dimensional tabular view; and (3) a multi-directional capability for providing context sensitive traversing between the supply chain visualizer and the plan display.

These and other advantages and features of the present invention will become readily apparent to those skilled in the art upon examination of the subsequent detailed description and accompanying drawings. Accordingly additional advantages and features of the present invention and the scope thereof are pointed out with particularity in the claims and form a part hereof.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 4 illustrates a visual representation of a plan display according to the preferred embodiment of the present invention.

DETAILED DESCRIPTION OF THE PREFERRED EMBODIMENT

Reference will now be made to the following detailed description of the preferred and alternate embodiments of the present invention. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
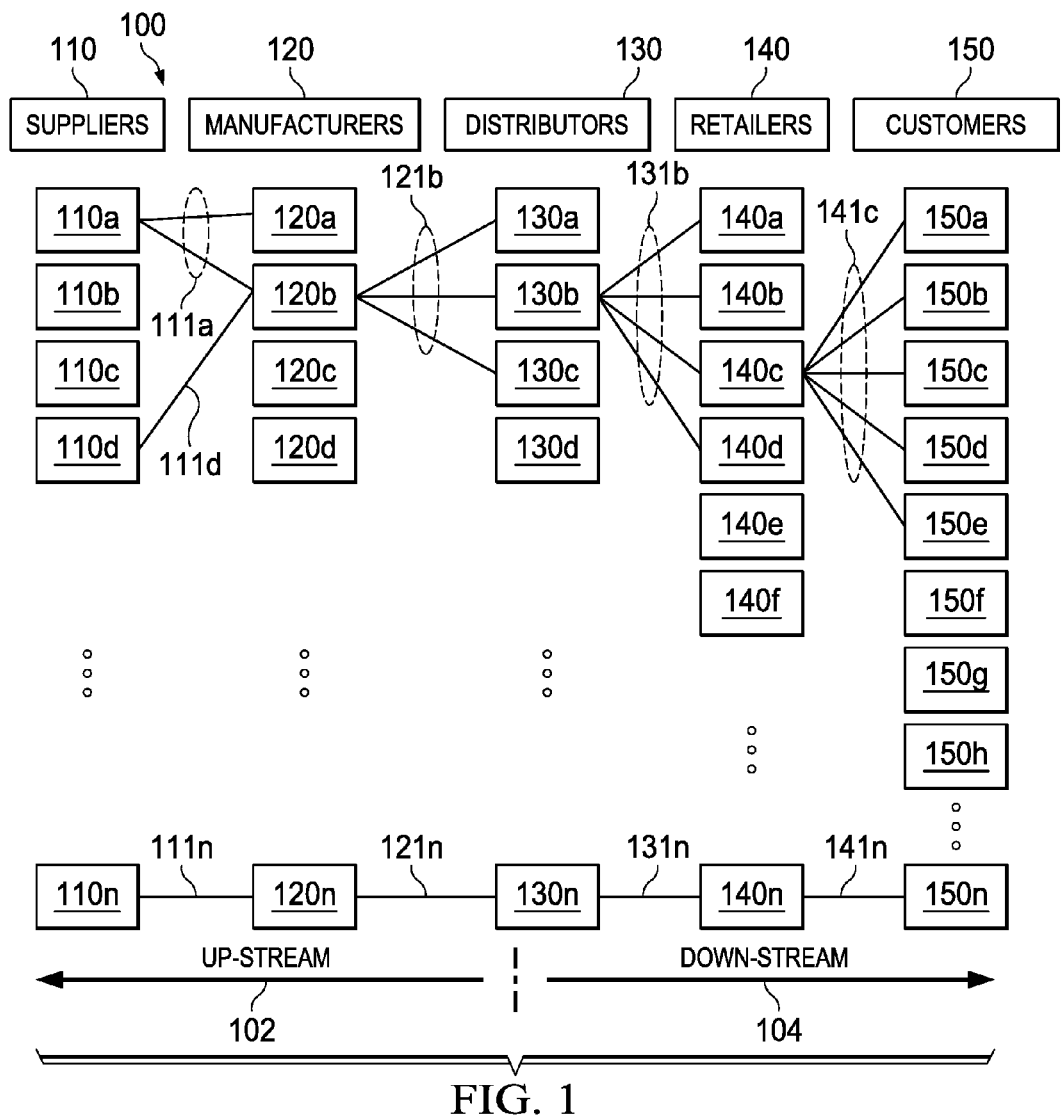
FIG. 1 illustrates a supply chain network according to the preferred embodiment of the present invention.

Referring now to FIG. 1 in the drawings, the preferred embodiment of a supply chain network 100 according to the present invention is illustrated. Supply chain network 100 comprises one or more suppliers 110, one or more manufactures 120, one or more distributors 130, one or more retailers 140, and one or more customers 150. Although supply chain network 100 is shown and described as having a plurality of suppliers 110a-110n, a plurality of manufactures 120a-120n, a plurality of distributors 130a-130n, a plurality of retailers 140a-140n, and a plurality of customers 150a-150n, the present invention contemplates any suitable number of suppliers 110, manufactures 120, distributors 130, retailers 140, and customers 150, according to particular needs. Additionally, although supply chain network 100 is shown and described as having supply and demand connections 111a, 111d, 121b, 131b, 141c, the present invention contemplates any suitable number of supply and demand connections 111a-111n, 121a-121n, 131a-131n, and 141a-141n, according to particular needs.

It is understood that supply and demand connections associated with supply chain network 100 represent material flowing downstream as illustrated by down-stream arrow 104 and represent demand propagated upstream as illustrated by up-stream arrow 102. Suppliers 110 are up-stream from manufacturers 120, distributors 130, retailers 140, and customers 150. Manufacturers 120 are down-stream from suppliers 110, but are up-stream from distributors 130, retailers 140, and customers 150. Distributors 130 are down-stream from suppliers 110 and manufacturers 120, but are up-stream from retailers 140, and customers 150. Retailers 140 are down-stream from suppliers 110, manufacturers 120 and distributors 130, but are up-stream from customers 150. Customers 150 are down-stream from suppliers 110, manufacturers 120, distributors 130, retailers 140, and customers 150. In addition or as an alternative, some networks may include cycles as is the case of representing returns or repairs in aftermarket service situations.

Suppliers 110 comprise one or more suppliers 110a-110n that supply materials to manufacturers 120 via supply and demand connections 111a-111n. Materials may be for example, raw materials, component parts, or like materials, that manufacturers 120 may use to manufacture products. Manufacturers 120 comprise one or more manufacturers 120a-120n that receive supply materials from suppliers 110 via supply and demand connections 111a-111n. Products may be, for example, computers, phones, televisions, or like products that manufacturers 120 may manufacture or customers 150 may purchase. Distributors 130 comprise one or more distributors 130a-130n that receive products from manufacturers 120 via supply and demand connections 121a-121n and provide to retailers 140 via supply and demand connections 131a-131n. Retailers 140 comprise one or more retailers 140a-140n that provide products to customers 150 via supply and demand connections 141a-141n.

In the preferred embodiment of the present invention, retailers 140 comprise one or more physical store locations where customers 150 may purchase products from retailers 140. In an alternate embodiment retailers 140 comprise one or more websites or virtual store locations that customers 150 may access and purchase products from retailers 140. In a further alternate embodiment retailers 140 comprise one or more call centers or quasi-virtual store locations that customers 150 may call and purchase products from retailer 140. Although retailers 140 are described as comprising a physical store location, a virtual store location, or a quasi-virtual store location, the present invention contemplates retailers 140 combining any or all of these various types of store locations, according to particular needs.

Customers 150 comprise one or more customers 150a-150n that purchase products through supply chain network 100, and in particular retailers 140. For example, customers 150 may comprise one or more individuals purchasing a product for personal or business use. As another example, customers 150 may comprise one or more computer systems capable of automatically searching for and purchasing products from one or more retailers 140 via supply and demand connections 141a-141n. The one or more retailers 140 may comprise one or more computer systems capable of interfacing with the one or more computer systems of customers 150 for the negotiation and delivery arrangements of products, according to particular needs.

To further explain the operation of supply chain network 100, an example is now given. In the following example, supplier 110a may supply materials to multiple manufactures 120a and 120b via supply and demand channel 111a and 111b, manufacturer 120b may also receive materials from an alternative supplier 110d via supply and demand channel 111d, manufacturer 120b may supply products to multiple distributors 130a, 130b and 130c via supply and demand channel 121a, 121b and 121c, distributor 130b may supply products to multiple retailers 140a, 140b, 140c, and 140d via supply and demand channel 141a, 141b, 141c, and 141d, and retailer 140c may supply products to multiple customers 150a, 150b, 150c, 150d, and 150e via supply and demand connections 141c, 150b, 141c, and 141d.

Although suppliers 110, manufacturers 120, distributors 130, retailers 140, and customers 150 are shown and described as being separate from each other, the present invention contemplates two or more of these supply chain entities being combined, according to particular needs. For example, suppliers 110 and manufacturers 120 may be supply chain entities within a single enterprise or distributors 130 and retailers 140 may be supply chain entities within a single enterprise. Although supply chain network 100 is shown and described as having each of these supply chain entities, the present invention also contemplates supply chain network 100 excluding one or more of these supply chain entities, according to particular needs. For example, supply chain network 100 may exclude distributors 130 and manufactures may supply products directly to retailers 140 or retailers 140 may be excluded and distributors 130 may supply products directly to customers 150.

Customers 150 communicate customer demand to retailers 140 via supply and demand connections 141a-141n to purchase products from supply chain network 100 and in particular to purchase products from retailers 140. Retailers 140 supplies products to customers 150 via supply and demand connections 141a-141n in response to customer demand. Supply and demand connections 141a-141n may comprise one or more processes, sites, or modes of transportation or electronic communication for supplying products to customers 150. In the preferred embodiment of the present invention, supply and demand connections 141a-141n may comprise one or more physical store locations where customers 150 may purchase products from retailers 140 and one or more processes for implementing and completing the purchases. In an alternate embodiment of the present invention, supply and demand connections 141a-141n may comprise one or more warehouses or stocking locations and one or more processes and modes of transportation for implementing and completing the purchases from the warehouse or stocking location to customers 150 who purchased via one or more websites or virtual store locations or one or more call centers or quasi-virtual store locations.

Accordingly, when customers 150 purchase a product from retailers 140 at a physical store location, retailers 140 typically provides the product to customers 150 substantially immediately after the completion of the transaction. Alternatively, when customers 150 orders a product from retailers 140 at a physical store location or when customers 150 orders or purchases a product at a virtual store location or at a quasi-virtual store location, retailers 150 typically ships the product to customers 150 substantially immediately after the completion of the transaction. As a result, retailers 140 must have inventory in stock to provide or ship the product to customers 150 at the time the product is ordered or purchased to meet the substantially immediate customer demand. As will be explained in more detail below, the unpredictable nature of customer demand at retailers 140 may create potential backorders or delays within supply and demand connections 141a-141n.

Retailers 140 communicate retailer demand to distributors 130 via supply and demand connections 131a-131n to order or purchase products from supply chain network 100 and, in particular, to order or purchase products from distributors 130. Distributors 130 supplies products to retailers 140 via supply and demand connections 131a-131n in response to retailer demand. Supply and demand connections 131a-131n may comprise one or more processes, sites, or modes of transportation or electronic communication for supplying products to retailers 140. In the preferred embodiment of the present invention, supply and demand connections 131a-131n may comprise one or more physical store locations where retailers 140 may order or purchase products from distributor 130 and one or more processes for implementing and completing the orders or purchases. In an alternate embodiment of the present invention, supply and demand connections 131a-131n may comprise one or more warehouses or stocking locations and one or more processes and modes of transportation for implementing and completing the orders or purchases from the warehouse or stocking location to retailers 140 who purchased via one or more websites or virtual store locations or one or more call centers or quasi-virtual store locations.

Since retailers 140 must order or purchase products from distributors 130 in advance to meet down-stream customer demand, a planner within retailers 140 may forecast customer demand to determine how many products to order or purchase from up-stream distributors 130 and when to order or purchase the products. A delay may be associated with supply and demand connections 131a-131n. Because of this potential delay, retailers 140 must order or purchase products from distributors 130 in advance to have inventory in stock by a certain date to meet actual customer demand. However, as a result of the unpredictable nature of customer demand, forecasting customer demand is typically a difficult task and inaccuracies in the planner's forecast of customer demand may cause retailers 140 to incur substantial costs. The planner within retailers 140 may maintain a safety stock in inventory to reduce the likelihood that retailers 140 will be unable to meet customer demand if actual customer demand exceeds forecasted customer demand.

Distributors 130 communicate distributor demand to manufactures 120 via supply and demand connections 121a-121n to order or purchase products from supply chain network 100 and in particular to order or purchase products from manufacturers 120. Manufacturers 120 supplies products to distributors 130 via supply and demand connections 121a-121n in response to distributor demand. Supply and demand connections 121a-121n may comprise one or more processes, sites, or modes of transportation or electronic communication for supplying products to distributors 130. In the preferred embodiment of the present invention, supply and demand connections 121a-121n may comprise one or more physical store locations where distributors 130 may order or purchase products from manufacturers 120 and one or more processes for implementing and completing the orders or purchases. In an alternate embodiment of the present invention, supply and demand connections 121a-121n may comprise one or more warehouses, stocking locations, or electronic storage and one or more processes and modes of transportation for implementing and completing the orders or purchases from the warehouse or stocking location to distributors 130 who purchased via one or more websites or virtual store locations or one or more call centers or quasi-virtual store locations.

Since distributors 130 must order or purchase products from manufacturers 120 in advance to meet down-stream retailer demand, a planner within distributors 130 may forecast retailer demand to determine how many products to order or purchase from up-stream manufacturers 120 and when to order or purchase the products. A delay may be associated with supply and demand connections 121a-121n. Because of this delay, distributors 130 must order or purchase products from manufacturers 120 in advance to have inventory in stock by a certain date to meet actual retailer demand. However, as a result of the unpredictable nature of retailer demand, forecasting retailer demand is typically a difficult task and inaccuracies in the planner's forecast of retailer demand may cause distributors 130 to incur substantial costs. Because retailer demand is derived from customer demand, retailer demand may be even more unpredictable than customer demand and, as a result, forecasting retailer demand by a planner may even be more difficult than a planner forecasting customer demand. Like the planner within retailers 140, the planner within distributors 130 may maintain a safety stock in inventory to reduce the likelihood that distributors 130 will be unable to meet retailer demand if actual retailer demand exceeds forecasted retailer demand.

Manufacturers 120 communicate manufacturing demand to suppliers 110 via supply and demand connections 111a-111n to order or purchase materials from supply chain network 100 and in particular to order or purchase materials from suppliers 110. Suppliers 110 supplies materials to manufacturers 120 via supply and demand connections 111a-111n in response to manufacturing demand. Supply and demand connections 111a-111n may comprise one or more processes, sites, or modes of transportation or electronic communication for supplying materials to manufacturers 120. In the preferred embodiment of the present invention, supply and demand connections 111a-111n may comprise one or more physical store locations where manufacturers 120 may order or purchase materials from suppliers 110 and one or more processes for implementing and completing the orders or purchases. In an alternate embodiment of the present invention, supply and demand connections 111a-111n may comprise one or more warehouses, stocking locations, or electronic storage devices and one or more processes and modes of transportation for implementing and completing the orders or purchases from the warehouse, stocking, or storage location to manufacturers 120 who purchased via one or more websites or virtual store locations or one or more call centers or quasi-virtual store locations.

Since manufacturers 120 must order or purchase materials from suppliers 110 in advance to meet down-stream manufacturing demand, a planner within manufacturers 120 may forecast manufacturing demand to determine how much material to order or purchase from up-stream suppliers 110 and when to order or purchase the materials. A delay may be associated with supply and demand connections 111a-111n. Because of this delay, manufacturers 120 must order or purchase materials from suppliers 110 in advance to have inventory in stock by a certain date to meet actual manufacturing demand. However, as a result of the unpredictable nature of manufacturing demand, forecasting manufacturing demand is typically a difficult task and inaccuracies in the planners forecast of manufacturing demand may cause manufacturers 120 to incur substantial costs. Because manufacturing demand is derived from retailer demand, which is in turn derived from customer demand, manufacturing demand may be even more unpredictable than retailer or customer demand and, as a result, forecasting manufacturing demand by a planner may even be more difficult than a planner forecasting retailer or customer demand. Like the planner within distributors 130 and the planner within retailers 140, the planner within manufacturers 120 may maintain a safety stock in inventory to reduce the likelihood that manufacturers 120 will be unable to meet manufacturing demand if actual manufacturing demand exceeds forecasted manufacturing demand.

Since suppliers 110 must begin production in advance to meet down-stream manufacturing demand, a planner within suppliers 110 may forecast manufacturing demand to determine how much material to produce and when to produce the materials. A delay may be associated with supply and demand connections 111a-111n. Because of this delay, suppliers 110 must produce materials in advance to have inventory in stock by a certain date to meet actual manufacturing demand. However, as a result of the unpredictable nature of manufacturing demand, forecasting manufacturing demand at suppliers 110 is typically a difficult task and inaccuracies in the planner's forecast of manufacturing demand may cause suppliers 110 to incur substantial costs. Because manufacturing demand is derived from retailer demand, which is in turn derived from customer demand, manufacturing demand may be even more unpredictable than retailer or customer demand and, as a result, forecasting manufacturing demand by a planner at suppliers 110 may even be more difficult than a planner forecasting manufacturing demand at manufacturers 120 or a planner forecasting retailer or customer demand. Like the planner within manufacturing 120, the planner within distributors 130 and the planner within retailers 140, the planner within suppliers 110 may maintain a safety stock in inventory to reduce the likelihood that suppliers 110 will be unable to meet manufacturing demand if actual manufacturing demand exceeds forecasted manufacturing demand.

Figure 2:
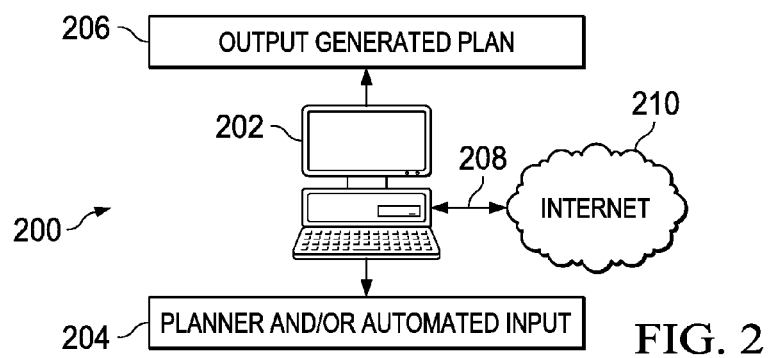
FIG. 2 illustrates a planning system according to the preferred embodiment of the present invention.

Referring now to FIG. 2 in the drawings, the preferred embodiment of a planning system 200, according to the present invention is illustrated. Planning system 200 comprises one or more computers 202, at least one planner and/or automated input 204, and an output generated plan 206. Planning system 200 further comprises internet 210 coupled to planning system 200 via a communication link 208. Network connectivity between planning system 200 and supply chain network 100 of FIG. 1, is provided via communications link 208 through, for example, internet 210. Those skilled in the art will recognize that the complete structure and operation of a computerized network and other components within planning system 200 are not depicted or described. The present invention may be employed in conjunction with known communications networks and other components, and only so much of those components as is unique to the present invention or necessary for an understanding of the present invention are depicted and described.

Planning system 200 may operate on one or more computers 202 at one or more locations. Computer 202 may be any computer, including, but not limited to, a desktop computer, a laptop computer, a portable computers, a wireless communications device, a personal digital assistant device, a text-message transmission device, or the like. Computer 202 may include any suitable input device, such as a keypad, mouse, touch screen, microphone, or other device to input information. Computer 202 may further include an output device capable of conveying information associated with the operation of planning system 200, including digital or analog data, visual information, or audio information. Computer 202 may still further include fixed or removable storage media, such as magnetic computer disks, CD-ROM, or other suitable media to receive output form and provide input to planning system 200. Computer 202 may yet further comprise a processor and volatile or non-volatile memory to execute instructions and manipulate information according to planning system 200. Although on a single computer 202 is shown and described, planning system 200 may operate on separate computers 202, or may operate on one or more shared computers 202, without departing from the intended scope of the present invention.

Planner or automated input 204 may be provided for use in a planning session of supply chain network 100. As an example and not by way of limitation, planner or automated input 204 provided for use with supply chain network 100 may comprise a person handling supply or demand planning or one or more related tasks within at least one supply chain entity. Planner or automated input 204 may be associated with suppliers 110, manufacturers 120, distributors 130, retailers 140, and customers 150, of FIG. 1, or with two or more of these supply chain entities being combined, according to particular needs. For example, suppliers 110 and manufacturers 120 may be supply chain entities within a single enterprise comprising a single planner or automated input 204. In addition distributors 130 and retailers 140 may be supply chain entities within a single enterprise also comprising a single planner or automated input 204. Although supply chain network 100 is described as having each of these supply chain entities comprising a planner or automated input 204, the present invention also contemplates supply chain network 100 excluding one or more of these planner's or automated inputs 204, according to particular needs. For example, supply chain network 100 may exclude a planner or automated input 204 from distributors 130 and a planner or automated input 204 forecasting for manufactures may forecast supply directly for retailers 140 or a planner or automated input 204 for retailers 140 may be excluded and a planner or automated input 204 forecasting for distributors 130 may forecast supply directly for customers 150. In addition or as an alternative, planner or automated input 204 within supply chain network 100 may comprise a computer system programmed to autonomously handle planning or one or more related tasks within supply chain network 100.

Planner or automated input 204 of planning system 200 may generate output generated plans 206 based on inputs received from at least one of suppliers 110, manufactures 120, distributors 130, retailers 140, or customers 150 via at least one of supply and demand connections 111a, 111d, 121b, 131 b, 141c, and may be used by other planner's or automated input 204 within supply chain network 100 according to particular needs. In general, a planning cycle initiated on planning system 200 may include a planning session and a period of time separating the planning session from a following planning session. In addition or as an alternative a plan problem initiated on planning system 200 may include a short planned order, an over utilized resource, a safety stock violation, or any other plan problem. Planning system 200 may provide a planner or automated input 204 to access a planning session via supply chain visualizer 300 or plan display 400, shown and described below in FIGS. 3 and 4 respectively, or provide input specifying one or more goals. For example, maximization of throughput, minimization of costs or any other suitable goals, including causing planning system 200 to generate an output generated plan 206, according to particular needs.

Figure 3:
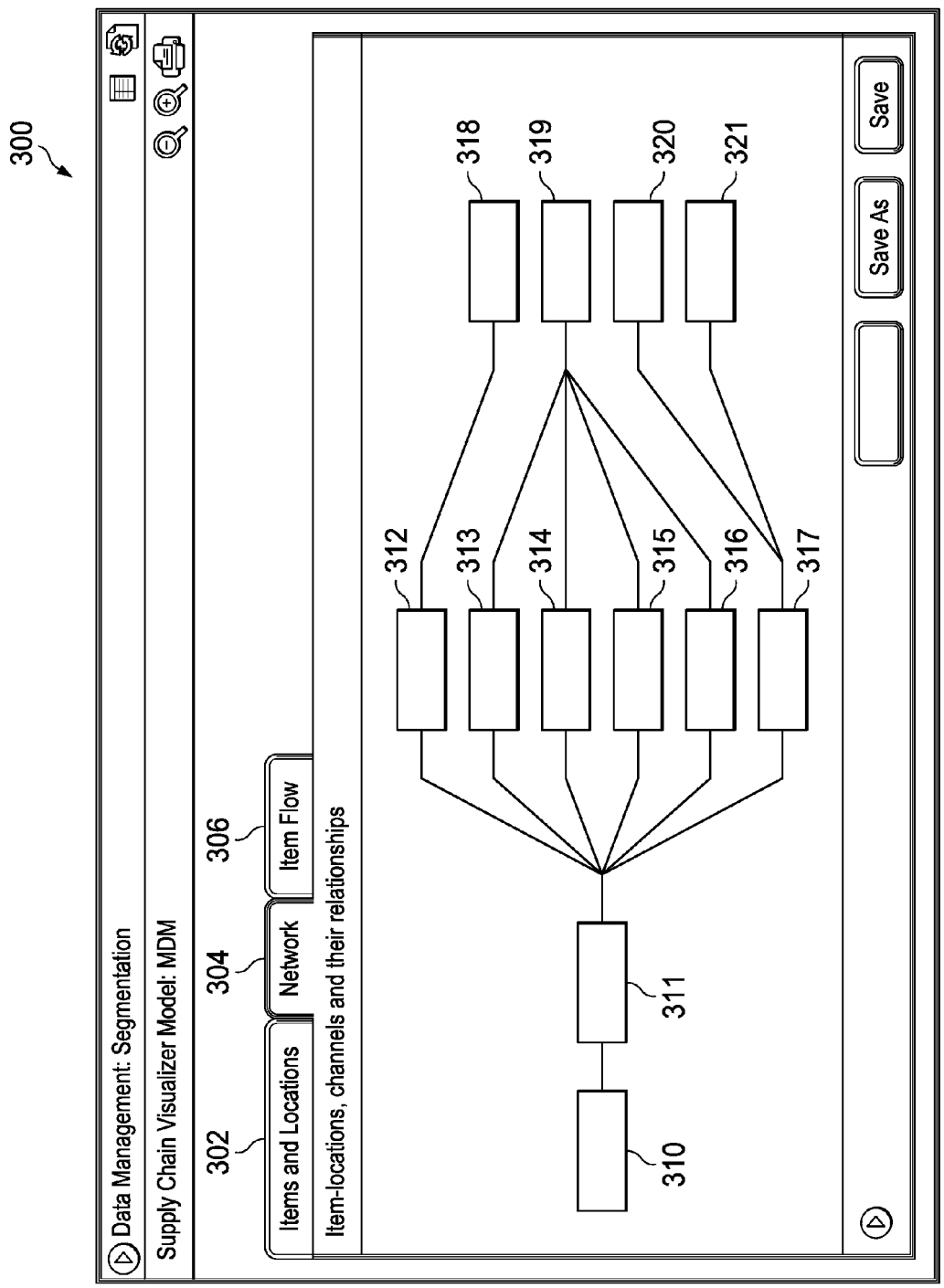
FIG. 3 illustrates a visual representation of a supply chain visualizer illustrating in greater detail the supply chain network of FIG. 1 according to the preferred embodiment of the present invention.

Referring now to FIG. 3 in the drawings, the preferred embodiment of a supply chain visualizer 300 illustrating in greater detail supply chain network 100 of FIG. 1, according to the present invention is illustrated. Supply chain visualizer 300 comprises a graphical user interface (GUI) of one or more tabs including one or more items and locations views 302, one or more network views 304, and one or more item flow views 306. Although supply chain visualizer 300 is shown and described as having a plurality of tabs including a plurality of items and locations views 302, a plurality of network views 304, and a plurality of item flow views 306, the present invention contemplates any suitable number or type of tabs for use in the GUI, according to particular needs.

Supply chain visualizer 300 comprises one or more visualization views that provide a visual representation of a supply chain illustrating in greater detail supply chain network 100. For example, supply chain visualizer 300 may comprise one or more assets that make up supply chain network 100, one or more attributes of each asset, including one or more relationships between the one or more assets and the one or more attributes, and one or more constraints about the one or more relationships. As another example, and not by way of limitation, supply chain visualizer 300 may comprise the ability to visualize networks and hierarchies mapped from the relational data of supply chain network 100. Supply chain visualizer 300 may further comprise the ability to create, extend or edit networks and hierarchies in the GUI of supply chain visualizer 300. Thereby creating the ability to dynamically and incrementally navigate up-stream or down-stream supply chain network 100 or the hierarchy therefrom, starting from any supply chain entity node within supply chain network 100, according to particular needs.

Items and locations view 302 comprises a visual representation of items, locations and their associations. Items and locations view 302 provides a planner the ability to visualize, create, and edit relationships between items and locations. Items are assets representing material in supply chain network 100 and may include materials, raw materials, component parts, stock-keeping-units (SKU's), products, data, or any other suitable items associated with supply chain network 100. Locations are assets representing stock-keeping locations, sites, facilities, data storage or plants in supply chain network 100. As an example and not by way of limitation, an item or SKU may be stocked at a location, having an item-location connection which further exemplifies this relationship as an inventory point at which an item may be stocked at the connected locations. The attributes of this inventory point may include such things as, for example, inventory carrying policies. Furthermore, each connection associated with items and locations view 302 represents an item-location asset associated with network view 304. A planner may select any item in items and locations view 302, to view the attributes of that item. Furthermore, the planner may also select any location in the items and locations view 302, to see the attributes of that location.

Item flow view 306 comprises a visual representation of the transformation path between items. Item flow view 306 provides a planner the ability to visualize an items transformation from one item to another item as these items are transferred down-stream supply chain network 100. A planner may select any item, within item flow view 306 such as for example a raw material item, thereby allowing the planner to view the item from its raw material form into its transformed components part form and finally into its transformed assembled finished goods form which may be ultimately purchased by the customer at the furthest downstream point of supply chain network 100.

Network view 304 comprises a visual representation of supply chain network 100 in terms of item-location assets and the connections between these assets that represent movement or transformation of items. Network view 304 provides a planner the ability to visualize, create and edit relationships between inventory carrying points of supply chain network 100. In essence, network view 304 provides for supply chain diagrams showing the material movement and transformation across supply chain network 100. Network 304 further comprises supply chain entity nodes 310-321 providing a visual representation of a supply chain illustrating in greater detail supply chain network 100.

As an example and not by way of limitation, the visual representation of a supply chain network 100 in network view 304 includes Chips at Factory node 310, representing the furthest node upstream in network view 304. Chips at Factory node 310 is connected via a supply and demand channel to Chips at Plant Warehouse node 311. The supply and demand channel connection from Chips at Factory node 310 to Chips at Plant Warehouse node 311 may symbolize a Bill of Distribution connection for a transport operation which may include attributes such as Item, Source Location, Destination Location, Transit Time Mean and Standard Deviation of Transit Time. Chips at Plant Warehouse node 311 is connected via supply and demand connections to down-stream nodes 312-317. The supply and demand channel connections from Chips at Plant Warehouse node 311 to nodes 312-317 may symbolize a Bill of Distribution connection for the stocking locations for Chips further downstream from Plant Warehouse node 310.

Sales Channel nodes 318-321 represent the furthest nodes down-stream in network view 304, thereby serving as "sink" nodes in supply chain network 100. Sales Channel nodes 318-321 are represented by connections with demand streams consuming material from supply chain network 100. In contrast, Chips at Factory node 310 serves as a "source" node in supply chain network 100, since it is the most up-stream node in network view 304. Although network view 304 is shown and described as having a plurality of supply and demand connections including a plurality of Bill of Distribution connections for a transport operation showing material being moved from one location to another, the present invention contemplates any suitable type of connections such as a plurality of Bill of Material connections for a transport operation showing material being transformed from one location to another, according to particular needs.

As shown in network view 304, nodes 310-321 may be represented as icons having an appearance related to the various type of items and locations at the respective node within supply chain network 100, the present invention contemplates any suitable shape or icon representing various types of items and locations, according to particular needs. Moreover, modifications such as additions or omissions may be made to supply chain visualizer 300 without departing from the scope of the invention. As an example and not by way of limitation, items and locations view 302, item flow view 306, or network view 304 may have more, fewer, or other shapes, icons, or graphical elements providing a visual representation of supply chain network 100. In addition or as an alternative, the operation of supply chain visualizer 300 may be performed by more, fewer, or other types of visual representation arranged in any suitable manner, according to particular needs.

As an example and not by way of limitation, the planner may select an item-location asset from the assets list in network view 304, and further select "Append Neighbors" or "Append Network Paths" to expose up-stream and downstream connection paths in the supply chain network 100. Although network 304 is shown and described as having plurality of supply chain entity nodes 310-321, the present invention contemplates any suitable number of supply chain entity nodes, according to particular needs. For example, suppliers 110a, manufactures 120b, distributors 130a-130c, retailers 140a-140d, and customers 150a-150e may be supply chain entities nodes within network view 304 of supply chain visualizer 300.

In the preferred embodiment of the present invention, supply chain visualizer 300 provides for stand-alone visualization capability. The stand-alone visualization capability provides the planner the ability to visualize any item-location from any specific point in supply chain network 100. The planner may, on demand, pin-point a specific item or location and navigate up-stream or down-stream to receive the associated parameters of the specific item-location assets and the connections between these assets. In alternative embodiment of the present invention, supply chain visualizer 300 provides for anchored navigation capability. The anchored navigation capability provides the planner with the ability to anchor to one or more item-location assets and determine the other nodes or entities also creating demand or being supplied by the one or more item-location assets. In this manner, the planner is able to ascertain supply and demand planning as related to the particular item-location. As an example and not by way of limitation, the planner may be only one of many other consumers in supply chain network 100 creating the demand for a particular item. The planner is then capable of determining a more intuitive understanding of the actual supply and demand associated with the item within supply chain network 100. This provides the planner a useful mechanism in understanding the likelihood of whether the distributors may or may not be able to supply a particular item in a particular timeframe.

The anchored navigation capability provides the planner with the ability to traverse from any supply chain entity node in supply chain network 100 and zoom into or zoom out of each supply entity node to visualize any and all consumers or producers of the item to thereby gain a higher-level appreciation of the item location interaction associated with supply chain network 100. In addition or as an alternative the anchored navigation capability is capable of providing a context sensitive traversing capability between the visual representation of multi-dimensional supply chain visualizer 300 and the visual representation of multi-dimensional plan display 400 of FIG. 4.

In a preferred embodiment of the present invention, supply chain visualizer 300 provides for a hyperlinked supply chain network view wherein a planner can view supply chain network 100 in a high-level visual representation of the supply chain network view. In addition or as an alternative, the planner may drill down into each supply chain entity node within supply chain visualizer 300 to investigate or analyze a particular plan problem within supply chain network 100, including but not limited to, on one or more assets, one or more attributes of each asset, one or more relationship between the one or more assets and the one or more attributes, and one or more constraints about the one or more relationships about each of the plurality of supply chain entity nodes. In essence, the planner can zoom into or zoom out-of each supply chain entity node within supply chain visualizer 300 and more specifically, network view 304.

In an alternate embodiment of the present invention, supply chain visualizer 300 provides a mouse-over function comprising a pop-up information display associated with each of the plurality of supply chain entity nodes. A planner may browse the supply chain network 100 with a computer mouse pointer using predetermined primary attributes for the pop-up information display. For example, a planner may select the predetermined primary attributes comprising the average time between nodes, the standard deviation between nodes, or any other attribute associated with supply chain network 100. The mouse-over function provides a planner the capability of quickly browsing the predetermined primary attributes of supply chain network 100, via the pop-up information display. Moreover, the mouse over function further provides a planner with the capability of drilling down into the plurality of supply chain entity nodes for a more detailed analysis of any predetermined secondary attributes.

As mentioned above in association with items and locations view 302, an item-location connection represents the association of an item that can be stocked at the connected locations, thereby creating a stock keeping relationship between the item and location. The stock keeping relationship provides the capability of navigating to its corresponding supply chain network diagram, which may be dynamically linked via its network dependencies. As an example and not by way of limitation, the stock keeping relationship provides for the navigation between at least one stock keeping location and a first demand supply chain node, a second demand supply chain node, and continuing downstream until the final customer supply chain node.

In another alternate embodiment of the present invention, a planner may select any arbitrary supply chain node in supply chain visualizer 300. In so doing, the planner may focus on the supply chain nodes predetermined primary attributes, predetermined secondary attributes, its network items, including all of its neighbors within the entire supply chain network 100 including up-stream and down-stream. Thereby providing the ability for the planner to traverse the entire supply chain network by going from any supply chain node within supply chain visualizer 300 to any other supply chain node within supply chain visualizer 300 during a planning session.

Referring now to FIG. 4 in the drawings, the preferred embodiment of a plan display 400 according to the present invention is illustrated. Plan display 400 comprises a graphical user interface (GUI) of one or more graphical elements including one or more filter listings 430, one or more item location listings 440 and one or more data measure listings 450. As fully described below in FIG. 5, a planner may traverse the multi-dimensional supply chain network 100 via a real-time interaction between plan display 400 and supply chain visualizer 300. Although plan display 400 is shown and described as having one or more graphical elements including a visual representation of a plurality of filter listings 430, a plurality of item location listings 440, and a plurality of data measure listings 450, the present invention contemplates any suitable number of graphical elements, according to particular needs. Plan display 400 may comprise a visual representation of one or more graphical elements in a tabular view, wherein each tabular view comprises a table including one or more rows and one or more columns. In addition or as an alternative, an intersection of any particular row with an associated connecting column may define a cell.

Filter listing 430 comprises a visual representation of various entities. As an example and not by way of limitation, filter listing 430 may comprise: Planner Code (PRESP), Criticality Group (CG), Item Type (Type), Percent change between last approved target and new target expressed in color codes (ChgPrcnt), Item backlog percent change expressed in color codes (ItmeBLPcnt), Item Location Backlog percent change expressed in color codes (ILBLPcnt), Item Excess percent change expressed in color codes (ItemExPcnt), Item Location Excess percent change expressed in color codes (ILExPcnt), and Upper Control Limit or Lower Control Limit control range to illustrate if the new target is within a specified range (ControlRng). Filter listing 430 further comprises one or more drop down filters, providing a planner with the capability to only focus on specific listings, in essence, these dynamic filters allow the planner the ability to decide what to filter on. As an example, and not by way of limitation, the planner may choose to filter only one type of location, or even filter using color coding to express the percentage change, according to particular needs.

Item location listing 440 comprises a visual representation of various entities. As an example and not by way of limitation, item locations listing 440 may comprise: Item, Location Type (LocType), and Location. Data measure listing 450 comprises a visual representation of at least the following data measures: an editable data measure of the Accepted Target (AcceptedTarget), an editable data measure of the Status of the specific inventory target (Status), a Last Approved Target value that is the previously approved target (LastApprovedTarget), a New Target value that is the inventory target from the current planning session (NewTarget), a Quantity Change expressed by NewTarget−LastApprovedTarget (QtyChange), an absolute percentage difference expressed by (NewTarget−LastApprovedTarget)/LastApprovedTarget*100

(PrctChg), a Item Location Backlog expressed by (NewTarget/ILBacklog)*100 where ILBacklog is the total backlog of an item at the specific location (ItemLocBacklog), a Item Backlog expressed by (NewTarget/Item Backlog)*100 where ItemBacklog is the total backlog of an item across all location as and is computed by plan display 400 using the ILBacklog numbers (ItemBacklog), a Item Location Excess expressed by (ILExcess/ILBacklog)*100 where ILExcess is the supply quantity that exceeds demand for an item at a location (ItemLocExcess), a Item Excess expressed by (ItemExcess/ItemBacklog)*100 where ItemExcess is the ILExcess numbers summed across all locations for a particular item (ItemExcess), and a Projected Cost expressed by (AcceptedTarget*Unit Cost)

(ProjectedCost). The data measure of Status may further comprise the following numerical values: 0=Reject, 1=Approve, 2=Not Reviewed, 3=Auto Rejected, and 4=Auto Approved.

Modifications, additions or omissions may be made to plan display 400 without departing from the scope of the invention. As an example and not by way of limitation, plan display 400 may have more, fewer, or other graphical elements, entities or data measures. Moreover, the operation of plan display 400 may be performed by more, fewer, or other graphical elements, entities, or data measures arranged in any suitable manner, according to particular needs.

In the preferred embodiment of the present invention, a planner may generate plan display 400 during a planning session. In addition or as an alternative, the planner is capable of understanding the supply chain network plan, by looking at totals, looking at changes, sorting, ordering, and other planning functions. As an example and not by way of limitation, a planner investigating or conducting analysis on a plan problem using plan display 400 is capable of dynamically understanding the supply chain network plan by looking at, for example, the manner in which items are allocated according to a specific budget, or the relational dependencies for each supply chain entity, item or location. In an alternate embodiment of the present invention, plan display 400 may further provide the planner with the capability of viewing the planning session, for example, across departments, across people, or across revenue generating products. In addition or as an alternative, this capability provides the planner with multiple views of the supply chain network plan allowing the planner to optimize and analyze the variations of the plan prior to implementing the planning session.

To further explain the operation of plan display 400 and its associated multi-directional elements, an example is now given. In the following example, a planner may select any cell and change the value. Plan display 400 will proportionately distribute the changed value across all members of supply chain network 100. In this manner, the planner conducting the planning session may have utilized a computerized optimization to provide recommendations as to how to distribute based on supply chain constraints or how the data should be allocated between individual members. However, the interactive capability of the visual representation of this tabular view provides for the injections of the planner's subjectivity in a very intuitive and systematic way without loosing the recommendations from the computerized optimizer. It is important to understand that a planner's subjectivity may be provided by the planner in order for the planning session to be more realistic.

As another example, the planner may select any target and inflate or deflate it by a percentage, an offset, or any other variable, according to particular needs. In this manner, plan display 400 provides a relational representation that allows the planner to dynamically drill up or drill down any supply chain entity node or computed result therefrom; coupled with the ability to subjectively change the information at a group level or individual level through proportional or increment/decrement features.

As yet another example, data measure listing 450 provides a planner with a visual representation of color coding based on a predetermined percentage of variation. For example, a color coding of green may provide for a small variation, a color coding of orange may provide for a medium variation, a color coding of red may provide for a big variation, and a color coding of pink may provide for the largest variation. The visual representation of the color coding provides a visual way for a planner to identify where to focus; in essence, it provides the planner with the ability to focus on one tree out of a forest of supply chain entity nodes. Although data measure listing 450 is shown and described as providing a visual representation of color coding having a plurality color codes associated with a percentage variation, the present invention contemplates any suitable visual representation of coding a cell located in the percentage change column based on predetermined percentage of change according to particular needs.

Figure 5:
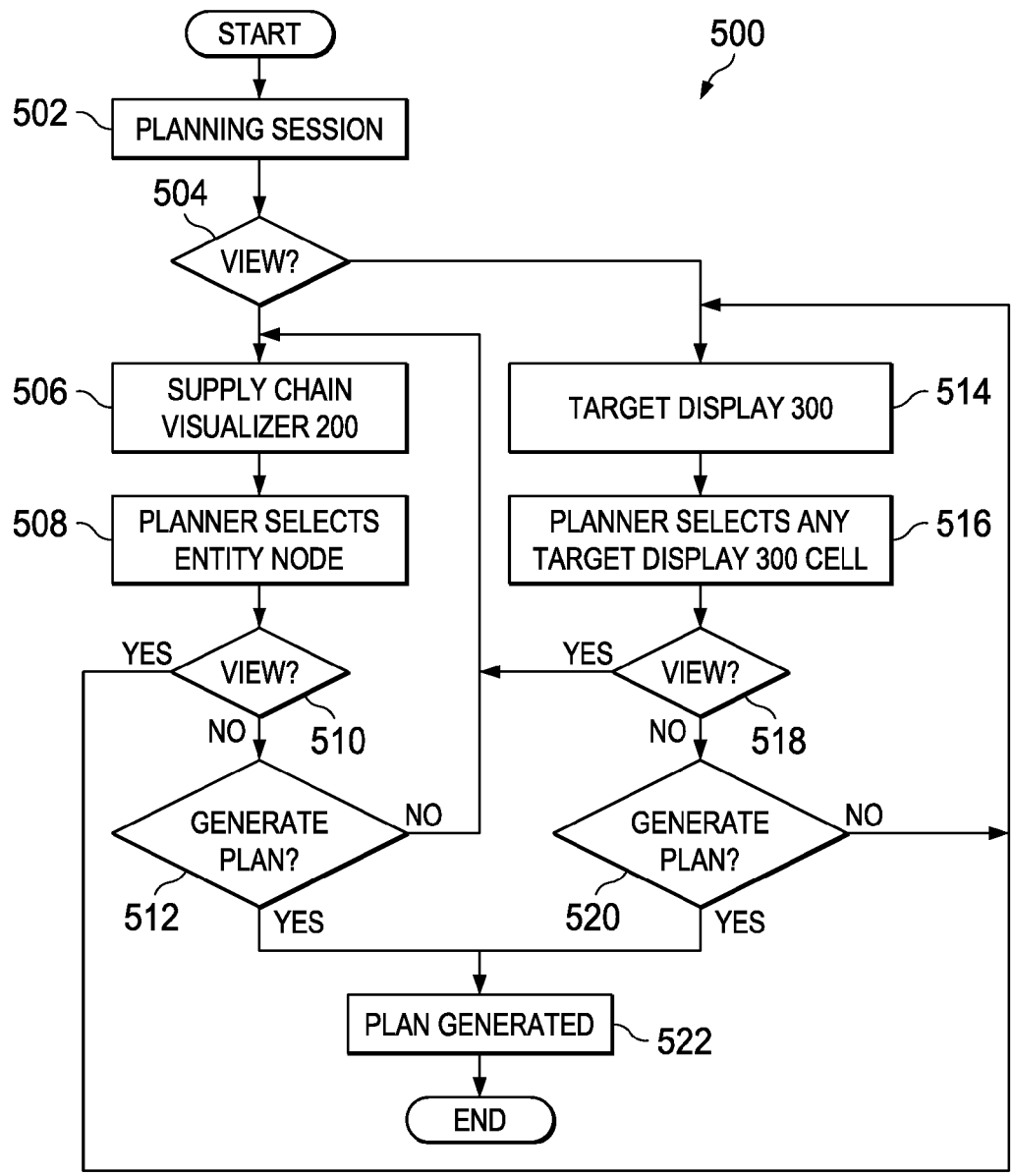
FIG. 5 depicts a high level flowchart illustrating the preferred method and operation of the present invention.

Referring now to FIG. 5 in the drawings, the preferred embodiment of a high level flowchart 500 of the present invention is illustrated. Flowchart 500 starts at step 502 with a planner initiating a planning session. It is recalled from the above description of FIG. 1 that, a planning cycle may include a planning session and a period of time separating the planning session from a following planning session. A plan problem may include a short planned order, an over utilized resource, a safety stock violation, or any other plan problem.

The planning session continues with inquiry step 504, in which a determination is made as to whether the planner chooses to investigate or conduct analysis on the plan problem via supply chain visualizer 300 or plan display 400. If the planner chooses to investigate the plan problem via supply chain visualizer 300, the process continues with step 506. On the other hand, if the planner chooses to investigate the plan problem via plan display 400, the process continues with step 514. As an example and not by way of limitation, the planner may investigate or conduct analysis on the planning session or plan problem by providing input specifying one or more goals, for example, maximization of throughput, minimization of costs or any other suitable goals, including causing the planning session to generate a plan according to particular needs.

Next as represented by step 506, supply chain visualizer 300 provides the planner a visual representation of a graphical view of supply chain network 100. The process continues with step 508, in which the planner selects a supply chain entity node to focus on one or more asset that make up supply chain network 100, one or more attributes of each asset, including one or more relationships between the one or more assets and the one or more attributes, or one or more constraints about the one or more relationships. As discussed above in FIG. 3, supply chain visualizer 300 provides the planner with the ability to visualize supply chain networks and hierarchies mapped from the relational data of supply chain network 100. The planner is capable of creating, extending or editing supply chain networks and hierarchies in the GUI of supply chain visualizer 300, thereby providing the ability to dynamically and incrementally navigate up-stream and down-stream supply chain network 100 or the hierarchy therefrom; starting from any supply chain entity node within supply chain network 100.

Next as represented by inquiry step 510, the planner is capable of selecting any supply chain entity node, any of its assets, its attributes, its constraints, or any of its relationships and is further capable to traversing to a visual representation of plan display 400. If the planner traverses to a visual representation of plan display 400, the process continues at step 514. On the other hand, If the planner does not traverse to a visual representation of plan display 400, the process continues at inquiry step 512. In this manner, supply chain visualizer 300 provides for a real-time interaction between the visual representation of the graphical view of supply chain visualizer 300 and the visual representation of the tabular view of plan display 400.

Next as represented by step 514, plan display 400 provides the planner a visual representation of a tabular view of supply chain network 100. The process continues with step 516, in which the planner selects any cell from filter listing 430, item location listing 440, or data measure listing 450. The planner is capable of highlighting the cell of interest and is further capable to traversing to a visual representation of supply chain visualizer 300, as represented by inquiry step 518. If the planner traverses to a visual representation of supply chain visualizer 300, the process continues at step 506. On the other hand, if the planner does not traverse to a visual representation of supply chain visualizer 300, the process continues at inquiry step 520. In this manner, plan display 400 provides for a real-time interaction between the visual representation of the tabular view of plan display 400 and the visual representation of the graphical view of supply chain visualizer 300. As discussed above in FIG. 4, the planner may have observed a color coded cell in data measure listing 450 or utilized the filtering function of filter listing 430 to select an item location cell for investigation or analysis.

The process continues with inquiry steps 512 and 520, in which a determination is made as to whether the planner wishes to generate a plan or continue the investigation or plan analysis of the planning session. If the planner is in step 512 and does not wish to generate a plan, the process continues at step 506. If the planner is in step 520 and does not wish to generate a plan, the process continues at step 514. In this manner, the planner is allowed to repeatedly navigate through supply chain visualizer 300 and plan display 400 until such time as the planner is able to understand the supply chain network and understand the multi-dimensional relationships of the plan. As an example and not by way of limitation, the planner is capable of building a planning session from the purely tabular view of plan display 400, the purely graphical view of supply chain visualizer 300 or the combination of the tabular and graphical views. Thereby providing the planner all of the advantages of understanding of supply chain network 100 from the tabular view of plan display 400 coupled with the advantages of solving the network visualization problem and constraints from the graphical views of supply chain visualizer 300. Next the process ends at step 522, in which the planner may cause the planning session to generate a plan according to the above investigation or analysis.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A supply chain system, the system comprising:
one or more computers, comprising:
a supply chain visualizer graphical user interface tangibly embodied on a non-transitory computer-readable medium, the supply chain visualizer visually representing data of one or more supply chain entity nodes in a graphical view mapped from a multi-dimensional supply chain network; and
a plan display graphical user interface tangibly embodied on a non-transitory computer-readable medium, the plan display visually representing one or more graphical elements in a multi-dimensional tabular view, each multi-dimensional tabular view comprising one or more tables wherein the one or more tables comprise an editable data measure of an accepted target, the one or more computers programmed to:
provide a multi-directional context sensitive traversing of the multi-dimensional supply chain network via a real-time interaction between the one or more supply chain entity nodes and the visual representation of the multi-dimensional tabular view;
provide a mouse-over function including a pop-up information display of the one or more supply chain entity nodes, the mouse-over function configured to provide a browsing function of the multi-dimensional supply chain network using at least one predetermined primary attribute for the pop-up information display;
change the data of the one or more supply chain entity nodes based on changes made to the editable data measure of the corresponding multi-dimensional tabular view; and
generate a plan.

2. The system of claim 1, further comprising one or more of:
assets in the multi-dimensional supply chain network;
assets in the multi-dimensional tabular view;
attributes of each of the one or more assets, including one or more relationship between the one or more assets and the one or more attributes; and
constraints associated with the one or more relationships.

3. The system of claim 2, wherein the supply chain visualizer comprises views selected from the group consisting of:
an items and locations view representing one or more items and one or more stock-keeping locations;
a network view representing connections between the one or more items and the one or more locations; and
an item flow view representing a transformation path between the one or more items in the multi-dimensional supply chain network.

4. The system of claim 3, wherein the one or more computers is further programmed to:
visualize networks and hierarchies mapped from relational data of the multi-dimensional supply chain network;
create, extend or edit networks and hierarchies in the supply chain visualizer graphical user interface; and
dynamically and incrementally navigate up or down the multi-dimensional supply chain network or the hierarchy therefrom, starting from at least one supply chain entity node within the multi-dimensional supply chain network.

5. The system of claim 1, wherein the plan display comprises views selected from the group consisting of:
filter listings view;
item location listings view; and
data measure listings view.

6. The system of claim 5, wherein the one or more computers further comprises:
the plan display visually representing items, locations and their respective associations, and wherein a planner computer system is programmed to:
visualize, create, and edit relationships between items and locations;
select at least one item to view the attributes of the item; and
select at least one location to view the attributes of the location.

7. The system of claim 6, wherein the filter listings view comprises one or more filters from the group consisting of a planner code, a criticality group, an item type, a percent change between a last approved target and a new target expressed in color codes, an item backlog percent change expressed in color codes, an item location backlog percent change expressed in color codes, an item excess percent change expressed in color codes, an item location excess percent change expressed in color codes, and an upper control limit or lower control limit control range illustrating if the new target is within a specified range.

8. The system of claim 6, wherein the data measure listing comprises data measures selected from the group consisting of:
an editable data measure of the accepted target;
an editable data measure of the status of the specific inventory target;
a last approved target value that is the previously approved target;
a new target value that is the inventory target from the current planning session;
a quantity change;
an absolute percentage difference;
an item location backlog;
an item backlog;
an item location excess;
an item excess; and
a projected cost.

9. The system of claim 8, wherein the status data measure comprises data measures selected from the group consisting of reject, approve, not reviewed, auto rejected, and auto approved.

10. The system of claim 1, wherein the one or more computers is further programmed to:
receive input from a planner computer system during a planning session specifying a plan problem;
reflect changes to data of the plan display back to data of the corresponding supply chain visualizer; and
reflect changes to data of the supply chain visualizer back to data of the corresponding plan display.

11. The system of claim 10, wherein the one or more computers is further programmed to:
provide a stand-alone visualization to visualize at least one item-location from at least one specific point in the multi-dimensional supply chain network;
provide an on-demand pin-pointing of a specific item or location to further navigate up-stream or down-stream of the multi-dimensional supply chain network; and
receive associated parameters of at least one specific item-location assets including connections between the assets.

12. The system of claim 10, wherein the one or more computers is further programmed to:
provide an anchored navigation to anchor to one or more of the item-location assets, the anchored navigation configured to:
determine other supply chain entity nodes or supply chain entities also creating demand or being supplied by the one or more item-location asset;
ascertain supply and demand planning as related to the one or more item-location asset; and
provide a context sensitive traversing between the supply chain visualizer and the plan display.

13. The system of claim 10, wherein
the mouse-over function configured to:
provide the planner computer system to browse the predetermined primary attributes of the multi-dimensional supply chain network, via the pop-up information display; and
provide the planner computer system to drill down into the one or more supply chain entity nodes for a more detailed analysis of at least one predetermined secondary attribute.

14. A computer-implemented method performed using one or more computer systems each comprising one or more processing units and one or more memory units at one or more locations, the method comprising:
visually representing data of one or more supply chain entity nodes, by a supply chain visualizer graphical user interface, in a graphical view mapped from a multi-dimensional supply chain network;
visually representing one or more graphical elements, by a plan display graphical user interface, in a multi-dimensional tabular view, each multi-dimensional tabular view comprising one or more tables wherein the one or more tables comprise an editable data measure of an accepted target;
providing a multi-directional context sensitive traversing of the multi-dimensional supply chain network via a real-time interaction between the one or more supply chain entity nodes and the multi-dimensional tabular view;
providing a mouse-over function including a pop-up information display of the one or more supply chain entity nodes;
providing a browsing function of the multi-dimensional supply chain network using at least one predetermined primary attribute for the pop-up information display;
changing the data of the one or more supply chain entity nodes based on changes made to the editable data measure of the corresponding multi-dimensional tabular view; and
generating a plan.

15. The computer-implemented method of claim 14, further comprising:
visualizing networks and hierarchies mapped from relational data of the multi-dimensional supply chain network;
creating, extending or editing networks and hierarchies in the supply chain visualizer graphical user interface; and
providing dynamic and incremental navigation up or down the multi-dimensional supply chain network or the hierarchy therefrom, starting from at least one supply chain entity node within the multi-dimensional supply chain network.

16. The computer-implemented method of claim 14, further comprising:
visually representing items, locations and their respective associations, a planner computer system programmed to:
visualize, create, and edit relationships between items and locations;
select at least one item to view the attributes of the item; and
select at least one location to view the attributes of the location.

17. The computer-implemented method of claim 14, further comprising:
receiving input from a planner computer system during a planning session specifying a plan problem;
reflecting changes to data of the plan display back to data of the corresponding supply chain visualizer; and
reflecting changes to data of the supply chain visualizer back to data of the corresponding plan display.

18. The computer-implemented method of claim 17, further comprising:
providing a stand-alone visualization to visualize at least one item-location from at least one specific point in the multi-dimensional supply chain network;

providing an on-demand pin-pointing of a specific item or location to further navigate up-stream or down-stream of the multi-dimensional supply chain network; and receiving associated parameters of at least one specific item-location assets including connections between the assets.

19. The computer-implemented method of claim 17, further comprising:

providing an anchored navigation to anchor to one or more of the item-location assets;

determining other supply chain entity nodes or supply chain entities also creating demand or being supplied by the one or more item-location asset;

ascertaining supply and demand planning as related to the one or more item-location asset; and providing a context sensitive traversing between the supply chain visualizer and the plan display.

20. The computer-implemented method of claim 17, further comprising:

providing the planner computer system further programmed to:

browse the predetermined primary attributes of the multi-dimensional supply chain network, via the pop-up information display; and drill down into the one or more supply chain entity nodes for a more detailed analysis of at least one predetermined secondary attribute.

21. A non-transitory computer-readable medium having encoded thereon software, the non-transitory computer-readable medium comprising instructions for:

visually represent data of one or more supply chain entity nodes, by a supply chain visualizer graphical user interface, in a graphical view mapped from a multi-dimensional supply chain network;

visually represent one or more graphical elements, by a plan display graphical user interface, in a multi-dimensional tabular view, each multi-dimensional tabular view comprising one or more tables wherein the one or more tables comprise an editable data measure of an accepted target;

providing a multi-directional context sensitive traversing of the multi-dimensional supply chain network via a real-time interaction between the one or more supply chain entity nodes and the multi-dimensional tabular view;

providing a mouse-over function including a pop-up information display of the one or more supply chain entity nodes;

providing a browsing function of the multi-dimensional supply chain network using at least one predetermined primary attribute for the pop-up information display;

changing the data of the one or more supply chain entity nodes based on changes made to the editable data measure of the corresponding multi-dimensional tabular view; and generating a plan.

22. The non-transitory computer-readable medium of claim 21, further comprising instructions for:

visualizing networks and hierarchies mapped from relational data of the multi-dimensional supply chain network;

creating, extending or editing networks and hierarchies in the supply chain visualizer graphical user interface; and providing dynamic and incremental navigation up or down the multi-dimensional supply chain network or the hierarchy therefrom, starting from at least one supply chain entity node within the multi-dimensional supply chain network.

23. The non-transitory computer-readable medium of claim 21, further comprising instructions for:

visually represent items, locations and their respective associations, visualizing, creating and editing relationships between items and locations;

selecting at least one item to view the attributes of the item; and selecting at least one location to view the attributes of the location.

24. The non-transitory computer-readable medium of claim 21, further comprising instructions for:

receiving input from a planner computer system during a planning session specifying a plan problem;

reflecting changes to data of the plan display back to data of the corresponding supply chain visualizer; and reflecting changes to data of the supply chain visualizer back to data of the corresponding plan display.

25. The non-transitory computer-readable medium of claim 24, further comprising instructions for:

providing a stand-alone visualization to visualize at least one item-location from at least one specific point in the multi-dimensional supply chain network;

providing an on-demand pin-pointing of a specific item or location to further navigate up-stream or down-stream of the multi-dimensional supply chain network; and receiving associated parameters of at least one specific item-location assets including connections between the assets.

26. The non-transitory computer-readable medium of claim 24, further comprising instructions for:

providing an anchored navigation to anchor to one or more of the item-location assets;

determining other supply chain entity nodes or supply chain entities also creating demand or being supplied by the one or more item-location asset;

ascertaining supply and demand planning as related to the one or more item-location asset; and providing a context sensitive traversing between the supply chain visualizer and the plan display.

27. The non-transitory computer-readable medium of claim 24, further comprising instructions for:

providing the planner computer system to browsing the predetermined primary attributes of the multi-dimensional supply chain network, via the pop-up information display; and provide the planner computer system to drill down into the one or more supply chain entity nodes for a more detailed analysis of at least one predetermined secondary attribute.

* * * * *

UNITED STATES PATENT AND TRADEMARK OFFICE
CERTIFICATE OF CORRECTION

PATENT NO.         : 9,704,108 B2                                    Page 1 of 1
APPLICATION NO.    : 11/218876
DATED              : July 11, 2017
INVENTOR(S)        : Adeel Najmi et al.

It is certified that error appears in the above-identified patent and that said Letters Patent is hereby corrected as shown below:

In the Specification

Please amend the paragraph appearing at Column 14, Line 45, as indicated below:
(NewTarget/ItemBacklog)*100

Signed and Sealed this
Fifth Day of September, 2017

Joseph Matal
*Performing the Functions and Duties of the*
*Under Secretary of Commerce for Intellectual Property and*
*Director of the United States Patent and Trademark Office*